US011919257B2

(12) United States Patent
Hirabayashi et al.

(10) Patent No.: US 11,919,257 B2
(45) Date of Patent: Mar. 5, 2024

(54) TAPE ARRANGING DEVICE

(71) Applicants: SUBARU CORPORATION, Tokyo (JP); TSUDAKOMA KOGYO KABUSHIKI KAISHA, Kanazawa (JP)

(72) Inventors: Daisuke Hirabayashi, Tokyo (JP); Isao Nishimura, Kanazawa (JP)

(73) Assignees: SUBARU CORPORATION, Tokyo (JP); TSUDAKOMA KOGYO KABUSHIKI KAISHA, Kanazawa (JP)

( * ) Notice: Subject to any disclaimer, the term of this patent is extended or adjusted under 35 U.S.C. 154(b) by 0 days.

(21) Appl. No.: 17/669,870

(22) Filed: Feb. 11, 2022

(65) Prior Publication Data

US 2022/0266545 A1 Aug. 25, 2022

(30) Foreign Application Priority Data

Feb. 25, 2021 (JP) .................................. 2021-029124

(51) Int. Cl.
*B29C 70/38* (2006.01)
(52) U.S. Cl.
CPC ................................ *B29C 70/388* (2013.01)
(58) Field of Classification Search
CPC ... B29C 70/388; B29C 70/386; B29C 70/384; B29C 70/382; B29C 70/38; B29C 70/546
See application file for complete search history.

(56) References Cited

U.S. PATENT DOCUMENTS

2016/0264375 A1\* 9/2016 Hatta ..................... B65H 57/14
2021/0206122 A1 7/2021 Kawabe et al.

FOREIGN PATENT DOCUMENTS

DE 10 2008 016 989 A1 10/2008
JP 2011-093276 A 5/2011
JP 2020-059145 A 4/2020

OTHER PUBLICATIONS

Translation of JP2020059145A, Published Apr. 16, 2020 (Year: 2020).\*
Extended European Search Report dated Jul. 7, 2022 for European Patent Application No. 22157873.5-1014.

\* cited by examiner

*Primary Examiner* — George R Koch
(74) *Attorney, Agent, or Firm* — MCGINN I.P. LAW GROUP, PLLC.

(57) ABSTRACT

A tape arranging device includes guide roller units and a moving unit. Tape materials are capable of passing through the respective guide roller units. Each of the tape materials is configured with fibers impregnated with resin. The moving unit is configured to move the guide roller units and to change a distance between adjacent ones of the guide roller units. The adjacent ones of the guide roller units are adjacent to each other.

10 Claims, 6 Drawing Sheets

TAPE ARRANGING DEVICE

CROSS-REFERENCE TO RELATED APPLICATIONS

This application is based on and claims priority under 35 USC 119 from Japanese Patent Application No. 2021-029124 filed on Feb. 25, 2021, the contents of which are incorporated herein by reference.

The present disclosure relates to a tape arranging device for arranging tape materials.

A composite material in which a resin (plastic) is combined with a fiber (fiber reinforced plastics (FRP)) is a material excellent in specific strength and specific rigidity Therefore, the composite material is used as structural materials and the like in the fields of automobiles, aircrafts, and space. The composite material is produced by laminating prepregs, fibers impregnated with a resin, to form a laminate, and then hardening the resin as disclosed, for example, in Japanese Unexamined Patent Application Publication (JP-A) No. 2011-093276.

In recent years, an automated fiber placement (AFP) method has attracted attention as a molding processing method capable of manufacturing a product having a complicated shape such as a three-dimensional curved surface with high accuracy and at high speed. The AFP method is a method in which a plurality of tape-shaped prepregs (hereinafter, simply referred to as "tape materials") are laminated adjacently without a gap in a width direction.

SUMMARY

The present disclosure relates to a tape arranging device. The tape arranging device includes guide roller units and a moving unit. Tape materials are capable of passing through the respective guide roller units. Each of the tape materials are configured with fibers impregnated with resin. The moving unit is configured to move the guide roller units and to change a distance between adjacent ones of the guide roller units. The adjacent ones of the guide roller units are adjacent to each other.

BRIEF DESCRIPTION OF DRAWINGS

The accompanying drawings are included to provide a further understanding of the disclosure and are incorporated in and constitute a part of this specification. The drawings illustrate an embodiment and, together with the specification, serve to explain the principles of the disclosure.

DESCRIPTION OF EMBODIMENTS

When a product having a complicated shape such as a three-dimensional curved surface is formed by using a tape material, it is desired to laminate tape materials arranged adjacently while appropriately changing a width of the tape materials. Hereinafter, a distance between center lines of adjacent tape materials is referred to as a "tape pitch" in a sheet configured with the tape materials arranged without a gap. When the tape pitch is changed, a width of the tape material itself may also be changed. Therefore, it is desired to develop a technique of arranging tape materials without a gap even when the width of the tape material is changed.

The present disclosure relates to a tape arranging device capable of arranging tape materials at any tape pitch.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Composite Material Manufacturing Apparatus 100

Figure 1:
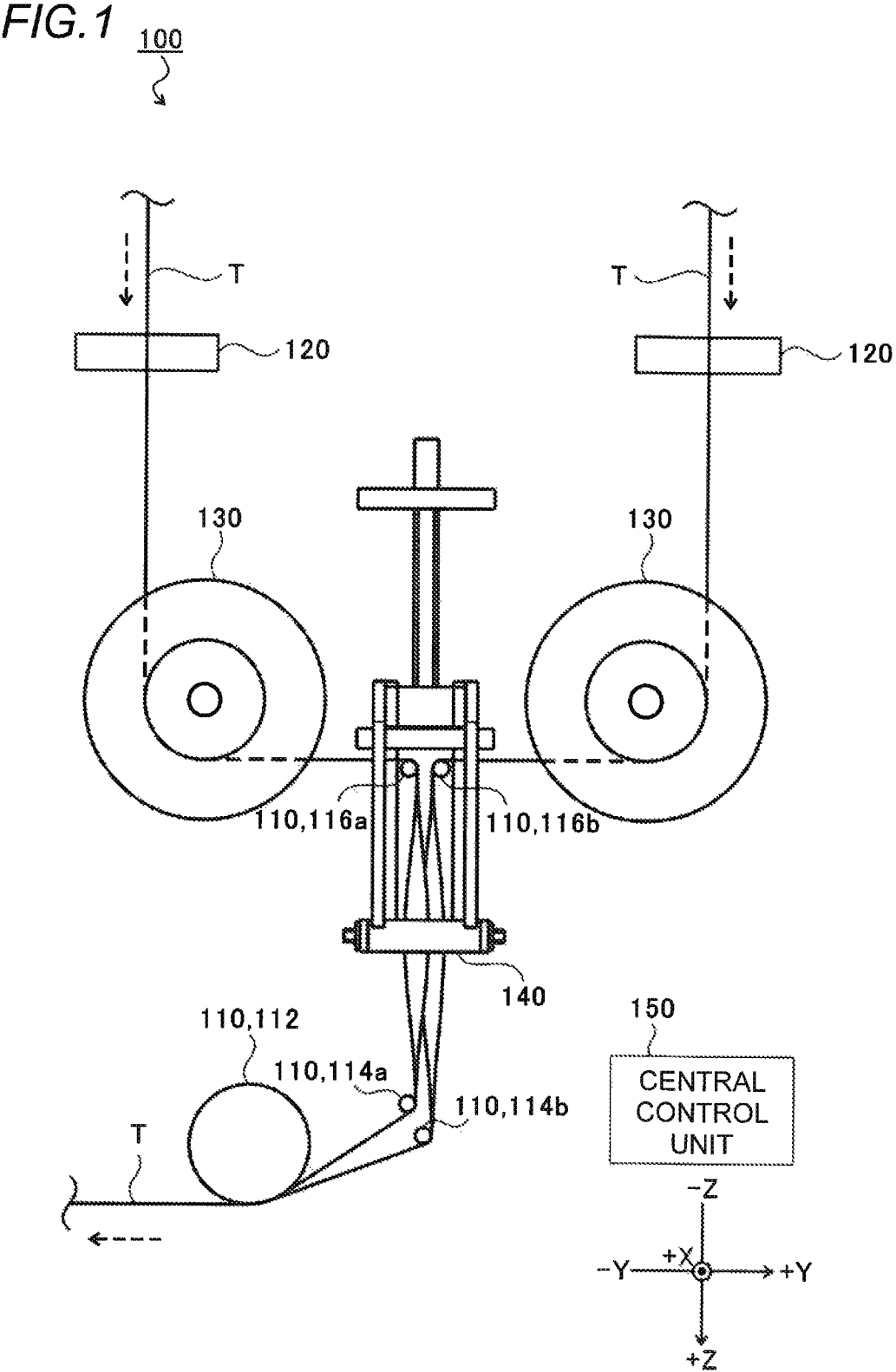
FIG. 1 is a diagram illustrating a composite material manufacturing apparatus according to an embodiment.

FIG. 1 is a diagram illustrating a composite material manufacturing apparatus 100 according to the embodiments. As shown in FIG. 1, the composite material manufacturing apparatus 100 includes a feeding device 110, heating devices 120, width adjusting devices 130, a tape arranging device 140, and a central control unit 150. In the following drawings including FIG. 1 in the embodiments, an X axis, a Y axis, and a Z axis which perpendicular to each other are defined as shown with respect to the tape arranging device 140. Further, in FIG. 1, a broken line arrow indicates a feeding direction of a tape material T by the feeding device 110.

The feeding device 110 sends out the tape material T supplied from a stock roller or the like around which the tape material T is wound. In the embodiments, the feeding device 110 sends out seven tape materials T, but the number of tape materials T is not limited to seven.

The tape material T is configured with prepregs. Prepregs are fibers impregnated with resin. The prepreg is used as a material of FRP (a composite material) such as CFRP or GFRP.

The fibers configuring the tape material T are, for example, any one or more of carbon fibers, glass fibers, boron fibers, aramid fibers, and polyarylate fibers. Polyarylate fibers includes, for example, Vectran, which is a registered trademark.

The resin configuring the tape material T is a thermosetting resin or a thermoplastic resin.

The thermosetting resin is, for example, any one or more of phenol resin (PF), epoxy resin (EP), melamine resin (MF), urea resin (UF), unsaturated polyester resin (UP), alkyd resin, polyurethane (PUR), thermosetting polyimide (PI), benzoxazine, and polybismaleimide (BMI).

The thermoplastic resin is, for example, any one or more of polyphenylene sulfide (PPS), pre-tetrafluoroethylene, polysulfone (PSF), polyether sulfone (PES), amorphous polyarylate (PAR), liquid crystal polymer (LCP), polyether ether ketone (PEEK), thermoplastic polyimide (PI), polyamide imide (PAI), polyamide (PA), nylon, polyacetal (POM), polycarbonate (PC), modified polyphenylene ether (modified PPE), polyethylene terephthalate (PET), polybutylene terephthalate (PBT), cyclic polyolefin (COP), polyethylene (PE), polypropylene (PP), polyvinyl chloride (PVC), polyvinylidene chloride, polystyrene (PS), polyvinyl acetate (PVAc), polyurethane (FUR), ABS resin, AS resin, acrylic resin (PMMA), and polyetherketone ketone (PEKK).

As shown in FIG. 1, the feeding device 110 includes a compaction roller 112, downstream support rollers 114a and 114b, and upstream support rollers 116a and 116b.

The compaction roller 112, the downstream support rollers 114a and 114b, and the upstream support rollers 116a and 116b each have a cylindrical shape. The compaction roller 112, the downstream support rollers 114a and 114b, and the upstream support rollers 116a and 116b are arranged such that rotation axes thereof are in an X-axis direction in FIG. 1.

The compaction roller 112, the downstream support rollers 114a and 114b, and the upstream support rollers 116a and 116b are provided at different positions in a flow direction of the tape material T. In the embodiments, the compaction roller 112 is provided downstream of the downstream support rollers 114a and 114b in the feeding direction of the tape material T. The downstream support rollers 114a and 114b are provided downstream of the upstream support rollers 116a and 116b in the feeding direction of the tape material T. That is, the upstream support rollers 116a and 116b, the downstream support rollers 114a and 114b, and the compaction roller 112 are provided in this order from an upstream side in the feeding direction of the tape material T.

In the embodiments, the downstream support roller 114a and the downstream support roller 114b are provided to be different in positions in a Y-axis direction and a 2-axis direction in FIG. 1. Further, the upstream support roller 116a and the upstream support roller 116b are provided to be different in positions in the Y-axis direction in FIG. 1.

The compaction roller 112 is moved while being pressed against a mold, and thereby the compaction roller 112 is passively rotated due to an adhesive force or a frictional force of the tape material T.

The tape materials T are stretched between the downstream support rollers 114a and 114b, and between the upstream support rollers 116a and 116b. Four tape materials T are stretched between the downstream support roller 114a and the upstream support roller 116a. Three tape materials T are stretched between the downstream support roller 114b and the upstream support roller 116b.

The downstream support rollers 114a and 114h and the upstream support rollers 116a and 116b change directions of the tape materials T such that each of the tape materials T vertically passes through an inside of the tape arranging device 140. The downstream support rollers 114a and 114b and the upstream support rollers 116a and 116b are rotated due to a frictional force or an adhesive force when the tape material T is sent out for lamination.

The heating devices 120 heats the tape materials T. The heating devices 120 are implemented by, for example, an electric heater, a heat exchanger, or a warm air blower. The heating devices 120 are provided upstream of the width adjusting device 130 in the feeding direction of the tape material T.

The width adjusting devices 130 are provided between the heating device 120 and the upstream support rollers 116a and 116b. The width adjusting devices 130 are fixed to a mount (not shown). The width adjusting device 130 changes, in response to a control command from the central control unit 150 to be described later, the width of the tape material T that has passed through the heating device 120. In the embodiments, the number of width adjustment devices 130 corresponding to the number of the tape materials T are provided, and each of the width adjusting device 130 changes a width of one tape material T. In this case, seven adjustment devices are provided. In the embodiments, each of the width adjusting devices 130 changes the width of the tape material T to substantially the same width. The width adjusting device 130 includes a main body which is formed by a bottom surface and a pair of wall surfaces whose interval gradually decreases and which has a path through which the tape material T passes. The width adjusting device 130 may include various techniques such as a technique of changing the interval between the wall surfaces at an outlet of the tape material in the path by changing a rotation angle of the main body, and a detailed description of the various techniques will be omitted here.

The width adjusting devices 130 adjust the widths of the respective tape materials T based on a tape width (tape pitch) of a sheet configured with the tape materials T that are sent out from the compaction roller 112 and arranged without a gap.

The tape materials T whose widths have been changed by the width adjusting devices 130 pass through the upstream support roller 116a and the upstream support roller 116b, and then the tape materials T are arranged without gaps by the tape arranging device 140. After that, the tape materials T pass through the downstream support rollers 114a and 114b and the compaction roller 112, then are laminated on a mold, are maintained at a predetermined temperature, and are formed into a composite material. The tape arranging device 140 will be described in detail later.

The central control unit 150 is configured with a semiconductor integrated circuit including a central processing unit (CPU). The central control unit 150 reads, from the ROM, programs, parameters, and the like for operating the CPU. The central control unit 150 manages and controls the entire composite material manufacturing apparatus 100 in cooperation with a RAM serving as a work area and other electronic circuits. In the embodiments, the central control unit 150 controls the width adjusting devices 130 and a link unit 260 (drive unit) of the tape arranging device 140 to be described later.

2. Tape Arranging Device 140

The tape arranging device 140 arranges the tape materials T, the widths of ich have been changed by the width adjusting devices 130, without gaps.

Figure 2:
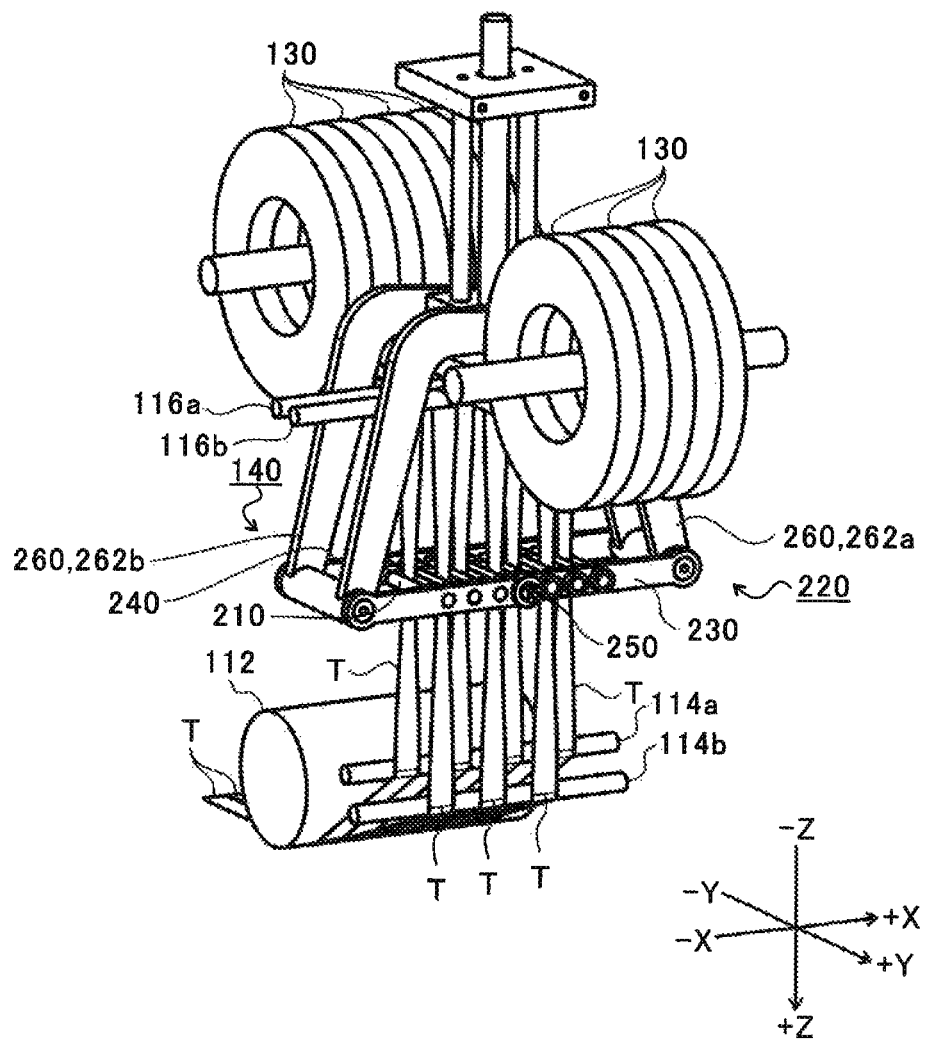
FIG. 2 is a perspective view of a tape arranging device.
Figure 3:
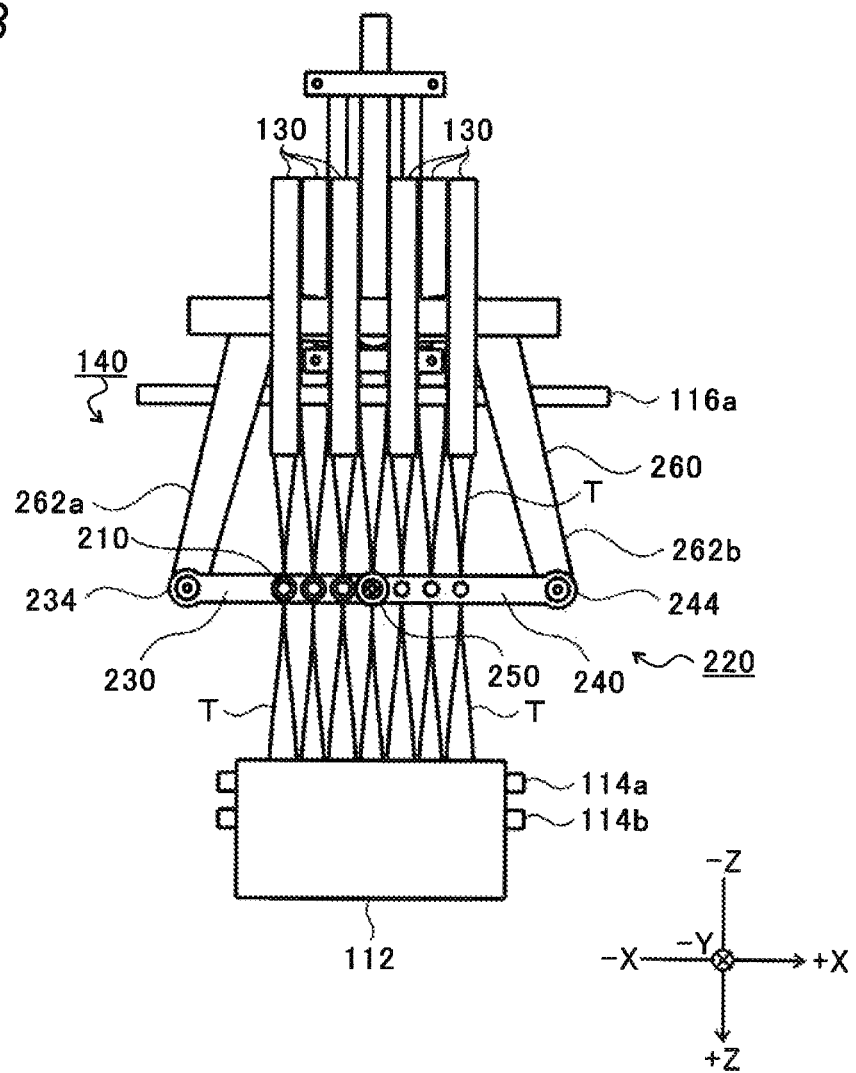
FIG. 3 is a side view of the tape arranging device.
Figure 4:
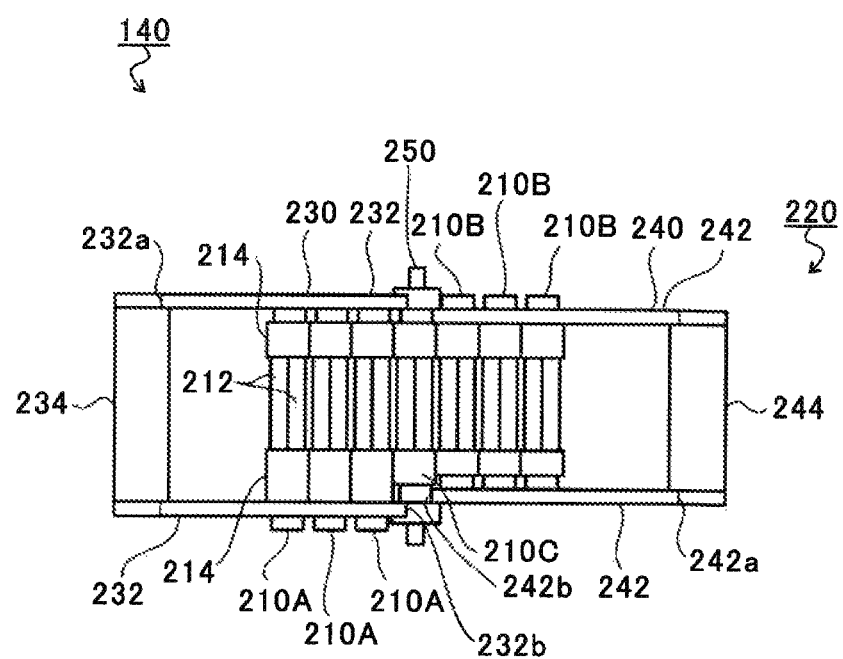
FIG. 4 is a top view of the tape arranging device.
Figure 4:
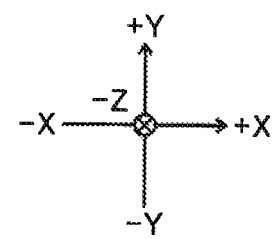

FIG. 2 is a perspective view of the tape arranging device 140. FIG. 3 is a side view of the tape arranging device 140. FIG. 4 is a top view of the tape arranging device 140. In FIG. 4, guide roller units 210 are shown as guide roller units 210A to 210C.

As shown in FIGS. 2 to 4, the tape arranging device 140 includes a plurality of guide roller units 210 and a moving unit 220.

The tape arranging device 140 includes the number of guide roller units 210 corresponding to the number of the tape materials T. In the embodiments, the tape arranging device 140 includes seven guide roller units 210. As shown in FIG. 4, the guide roller unit 210 includes a pair of roller bodies 212 and connecting portions 214. The roller bodies 212 each have a cylindrical shape or a columnar shape. The pair of roller bodies 212 are rotatably supported by the connecting portions 214. The pair of roller bodies 212 are supported by the connecting portions 214 such that rotation axes thereof are substantially parallel to each other. The connection portion 214 is rotatably supported by a first support portion 230 or a second support portion 240 to be described later. The connection portion 214 is supported by the first support portion 230 or the second support portion 240 such that the rotation axis of the roller body 212 and a rotation axis of the connection portion 214 are substantially parallel to each other.

The tape material T having passed through the upstream support rollers 116a and 116b passes between the pair of roller bodies 212 configuring the guide roller unit 210. In the embodiments, one tape material T passes through one guide roller unit 210. As shown in FIG. 2, in the embodiments, the tape material T that has passed through the upstream support roller 116a passes through facing surfaces of the guide roller unit 210 on a −Y-axis side in FIG. 2, and the tape material T that has passed through the upstream support roller 116b passes through facing surfaces of the guide roller unit 210 on a +Y-axis side in FIG. 2.

The moving unit 220 moves the guide roller units 210 to change a distance between adjacent guide roller units 210. In the embodiments, the moving unit 220 includes the first support portion 230, the second support portion 240, a shaft portion 250, and the link unit 260.

As shown in FIG. 4, the first support portion 230 includes two support rods 232 and a connecting rod 234. The two support rods 232 are spaced apart from each other by a predetermined interval. Three guide roller units 210A are supported between the two support rods 232. In one embodiment the guide roller units 210A may serve as "first guide roller units". The support rods 232 support the three guide roller units 210A such that the rotation axes of the guide roller units 210A, i.e. the rotation axes of the roller bodies 212 and the rotation axes of the connecting portions 214, are substantially parallel to one another (in the Y-axis direction in FIG. 4). The connecting rod 234 connects end portions 232a of the support rods 232 to each other. In one embodiment, each of the end portions 232a may serve as a "second end portion".

The second support portion 240 includes two support rods 242 and a connecting rod 244. The two support rods 242 are spaced apart from each other by a predetermined interval. The support rods 242 are provided substantially parallel to the support rods 232. Three guide roller units 210B are supported between the two support rods 242. In one embodiment the guide roller units 210B may serve as "second guide roller units". The support rods 242 support the three guide roller units 210B such that the rotation axes of the guide roller units 210B, i.e. the rotation axes of the roller bodies 212 and the rotation axes of the connecting portions 214, are substantially parallel to one another (in the Y-axis direction in FIG. 4). The connecting rod 244 connects end portions 242a (one end portions) of the support rods 242 to each other. In one embodiment, each of the end portions 242a may serve as a "fourth end portion".

The shaft portion 250 rotatably supports end portions 232b of the support rods 232 of the first support portion 230 and end portions 242b of the support rods 242 of the second support portion 240. In one embodiment, each of the end portions 232b may serve as a "first end portion" and each of the end portions 242b may serve as a "third end portion". The shaft portion 250 is fixed to a mount (not shown). A guide roller unit 210C is supported by the shaft portion 250. The shaft portion 250 supports the guide roller unit 210C such that a rotation axis of the guide roller unit 210C, i.e. the rotation axes of the roller bodies 212 and the rotation axes of the connection portions 214, is substantially parallel to the rotation axes of the guide roller units 210A and 210B (in the Y-axis direction in FIG. 4).

That is, the guide roller units 210A, 210B, and 210C are supported by the first support portion 230, the second support portion 240, and the shaft portion 250 such that the rotation axes thereof are substantially parallel to one another.

Description will be made referring back to FIGS. 2 and 3, the rotation axes of the guide roller units 210 (Y-axis direction in FIGS. 2 and 3) and the rotation axes of the upstream support roller 116a and the upstream support roller 116b (X-axis direction in FIGS. 2 and 3) are orthogonal to each other. Therefore, the tape materials T sent out from the upstream support roller 116a and the upstream support roller 116b and reaching the guide roller units 210 are each twisted (rotated) by 90 degrees around the Z axis in FIGS. 2 and 3.

Similarly, the rotation axes of the guide roller units 210 (Y-axis direction in FIGS. 2 and 3) and the rotation axes of the downstream support roller 114a and the downstream support roller 114b (X-axis direction in FIGS. 2 and 3) are orthogonal to each other. Therefore, the tape materials T sent out from the guide roller units 210 and reaching the downstream support roller 114a and the downstream support roller 114b are each twisted by 90 degrees around the Z axis in FIGS. 2 and 3.

The link unit 260 (drive unit) rotates the first support portion 230 and the second support portion 240 in a direction in which the connecting rod 234, i.e. the end portions 232a of the first support portion 230, and the connecting rod 244, i.e. the end portions 242a of the second support portion 240, are away from each other or approach each other. In the embodiments, the link unit 260 includes link members 262a and 262b and an actuator (not shown). The link member 262a is connected to the connecting rod 234. The link member 262b is connected to the connecting rod 244. The actuator moves the link members 262a and 262b in +Z-axis and −Z-axis directions in FIGS. 2 and 3.

The link unit 260 increase the tape pitch by rotating the first support portion 230 and the second support portion 240 in a direction in which the connecting rod 234 and the connecting rod 244 are away from each other. On the other hand, the link unit 260 reduce the tape pitch by rotating the first support portion 230 and the second support portion 240 in a direction in which the connecting rod 234 and the connecting rod 244 approach each other.

Figure 5A:
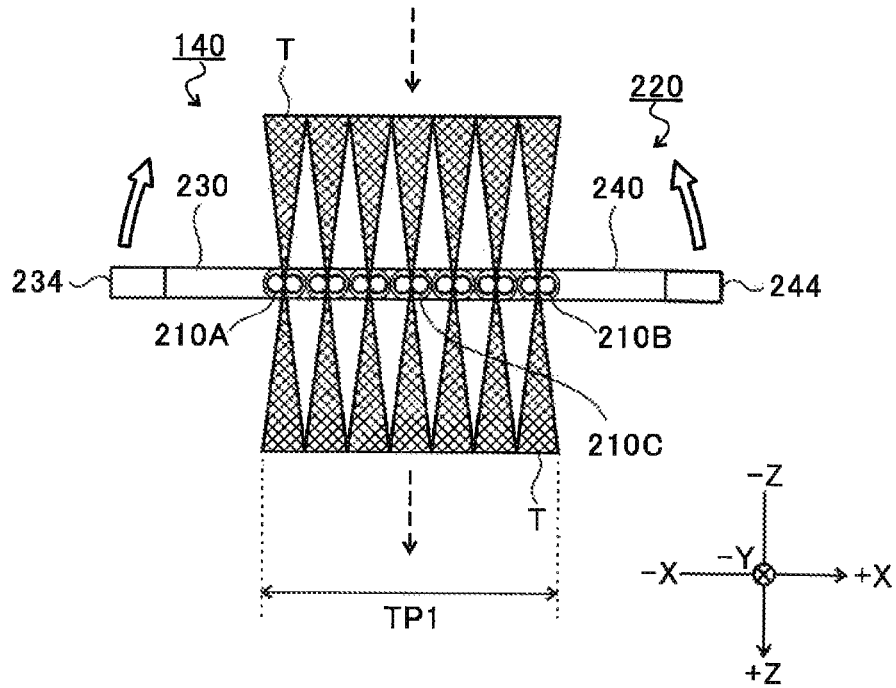
FIGS. 5A and 5B are diagrams illustrating movement of a first support portion and a second support portion that are moved by a link unit.
Figure 5B:
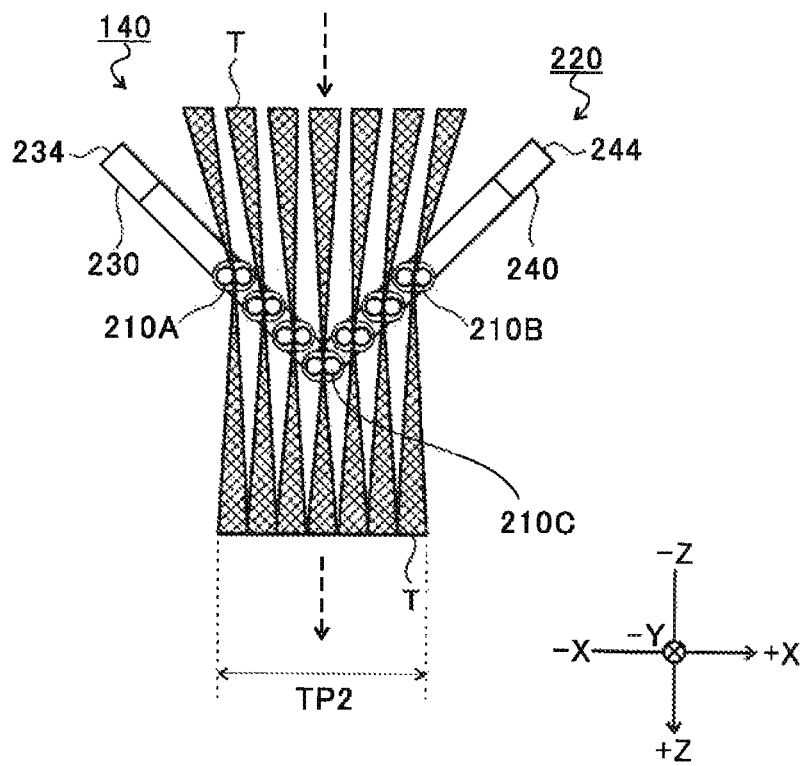

FIGS. 5A and 5B diagrams illustrating movement of the first support portion 230 and the second support portion 240 moved by the link unit 260. FIG. 5A is a diagram illustrating a first position. FIG. 5B is a diagram illustrating a second position. In FIGS. 5A and 5B, dashed arrows indicate the feeding direction (passing direction) of the tape material T. In FIGS. 5A and 5B, the tape material T is indicated by cross-hatching. Further, in FIGS. 5A and 5B, the guide roller units 210 are shown as the guide roller units 210A to 210C.

As shown in FIG. 5A, the first position is a position where the guide roller units 210A, the guide roller units 210B, and the guide roller unit 210C are arranged adjacently in the X-axis direction in FIG. 5A, in the embodiments, the distance between adjacent guide roller units 210 is designed such that a target maximum full width TP1 is obtained when the guide roller units 210 are disposed at the first position. The full width is a width of the tape materials T when the tape materials T having passed through the guide roller units 210 are arranged without a gap in the width direction of the tape materials T (X-axis direction in FIGS. 5A and 5B).

In the embodiments, the tape arranging device 140 arranges the tape materials T without a gap on a projection surface (XZ plane in FIGS. 5A and 5B), by the guide roller units 210. Therefore, the tape materials T having passed through the guide roller units 210 are separated from each other in the Y-axis direction in FIGS. 5A and 5B (non-contact, see FIG. 2).

At the first position, when the connecting rod 234 of the first support portion 230 and the connecting rod 244 of the second support portion 240 are moved toward the −Z-axis direction in FIG. 5A (shown by white arrows in FIG. 5A) by the link unit 260, the first support portion 230 and the second support portion 240 rotate around the shaft portion 250 with the shaft portion 250 as a rotation axis. Then, as shown in FIG. 5B, the connecting rod 234 of the first support portion 230 and the connecting rod 244 of the second support portion 240 approach each other, and the first support portion 230 and the second support portion 240 form a V shape with the shaft portion 250 as a base point. Therefore, a full width TP2 shown in FIG. 5B is smaller than the full width TP1 (see FIG. 5A) of the tape materials T that have passed through the guide roller unit 210 at the first position.

Figure 6A:
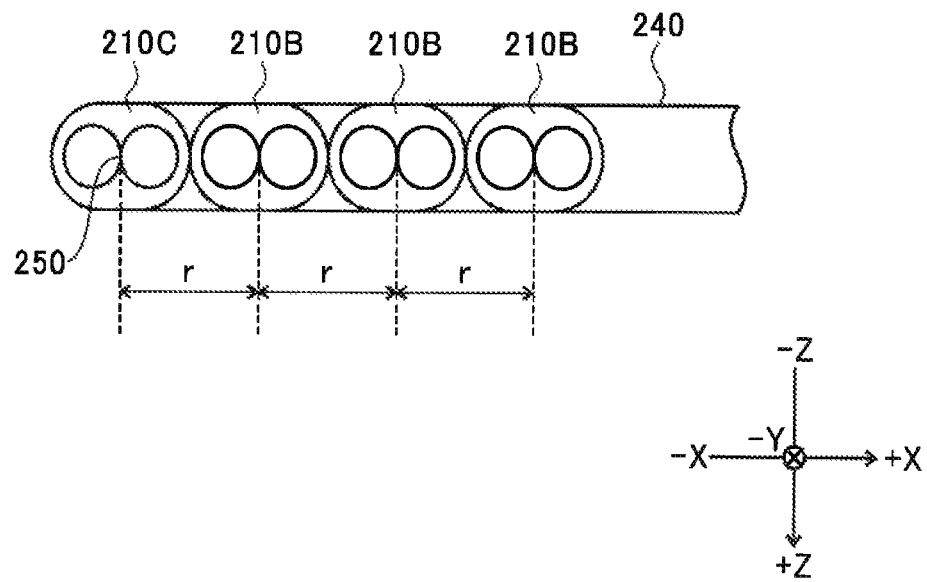
FIGS. 6A and 6B are diagrams illustrating a distance between guide roller units due to rotation of the first support portion and the second support portion.
Figure 6B:
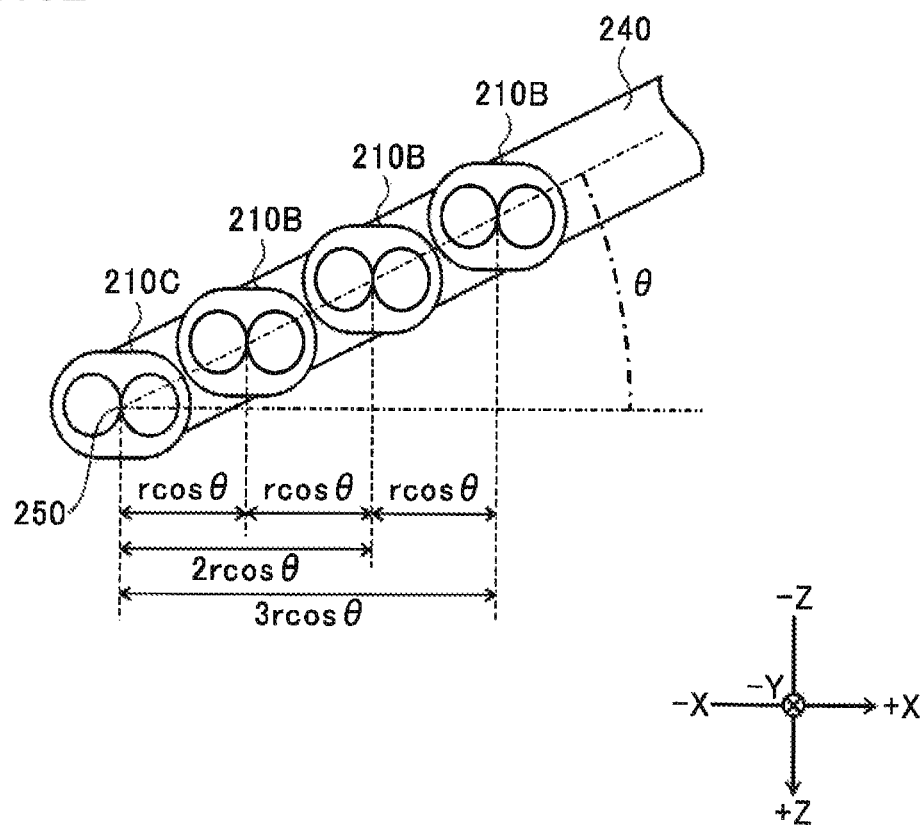

FIGS. 6A and 6B are diagrams illustrating the distance between the guide roller units 210 due to rotation. FIG. 6A is a diagram illustrating the distance between the guide roller units 210 at the first position. FIG. 6B is a diagram illustrating the distance between the guide roller units 210 after rotation. In order to facilitate understanding, the guide roller units 210A are omitted in FIGS. 6A and 6B.

As shown in FIG. 6A, at the first position, the guide roller units 210B are disposed on the second support portion 240 so as to be spaced apart from each other by the same distance r on a straight line with the shaft portion 250 as a center. Similarly, at the first position, the guide roller units 210A are disposed on the first support portion 230 so as to be spaced apart from each other by the same distance r on the straight line with the shaft portion 250 as a center.

As shown in FIG. 6B, when the first support portion 230 and the second support portion 240 are rotated by a rotation angle θ and deformed into a V shape, the distance between adjacent guide roller units 210A and the distance between adjacent guide roller units 210B are always r cos θ at equal distances. That is, when the first support portion 230 and the second support portion 240 are rotated by the rotation angle θ and deformed into a V shape, the tape pitch (the distance between tape centers of the adjacent tapes) is always r cos θ at equal distances. By changing the rotation angle θ in this way, the tape pitch can be changed.

Further, in the embodiments, the tape pitch is a minimum tape pitch when the link unit 260 moves the tape materials T to pass through the guide roller units 210 disposed at the second position.

As described above, the width adjustment device 130 adjusts the width of each tape material T according to a desired tape pitch.

As described above, the tape arranging device 140 according to the embodiments can easily change the tape pitch while maintaining the number of the tape materials T with a simple structure in which the first support portion 230 and the second support portion 240 are simply rotated. Therefore, the composite material manufacturing apparatus 100 including the tape arranging device 140 can easily mold a structure. The composite material manufacturing apparatus 100 including the tape arranging device 140 can also perform steering lamination in which the fibers are laminated while changing directions of the fibers.

When the tape pitch is changed by pressing the end portion of the tape material T, the end portion of the tape material T is deformed and the tape width is changed. Accordingly, in the tape arrangement device 140 of the embodiments, the guide roller unit 210 presses a surface of the tape material in order to change the tape pitch. As a result, the tape arranging device 140 can change the tape pitch while preventing damage to the tape material T, as compared with a case where the tape arranging device 140 presses the end portion of the tape material T.

Further, when the tape pitch is changed without changing a position of the central tape material T, it is necessary to relatively reduce a moving distance of the tape material T at a position close to the central tape material. T and relatively increase a moving distance of the tape material T at a position far from the central tape material T.

For this reason, in a comparative example in which a moving device is provided for each tape material T, the moving device is complicated, and control is difficult, so that there is a problem that many moving devices cannot be mounted on a laminating apparatus due to interference of the moving devices.

In contrast, as described above, the tape arranging device 140 according to the embodiments include the guide roller units 210, the first support portion 230, the second support portion 240, the shaft portion 250, and the link unit 260. Accordingly; the tape arranging device 140 can relatively reduce the moving distance of the tape material T located at a position close to the central tape material and relatively increase the moving distance of the tape material T located at a position far from the central tape material T with a simple structure in which the first support portion 230 and the second support portion 240 are simply rotated. Therefore, the tape arranging device 140 facilitates control related to the change of the tape pitch. Further, the tape arranging device 140 is lower in cost than that of the comparative example.

As described above, the upstream support roller 116a and the upstream support roller 116b have different positions in the Y-axis direction in FIG. 2. Therefore, when the tape materials T enter the guide roller units 210, a situation in which the adjacent tape materials T come into contact with each other can be avoided.

Further, the tape material T has adhesiveness, and when the tape materials T are integrated by contact with each other, there is a concern that the tape materials T may not be bent at the time of lamination. Therefore, the positions of the downstream support roller 114a and the downstream support roller 114b in the Y-axis direction and the Z-axis direction in FIG. 2 are made different from each other. Accordingly, the situation in which the adjacent tape materials T sent out from the guide roller units 210 come into contact with each other and are not bent at the time of lamination can be avoided.

Although the preferred embodiment has been described above with reference to the accompanying drawings, it is needless to say that the present invention is not limited to the embodiment. It is apparent that those skilled in the art can conceive of various modifications and alterations within the scope described in the claims, and it is understood that such modifications and alterations naturally fall within the technical scope of the present invention.

For example, in the above embodiment, a configuration in which the guide roller unit 210 includes a pair of roller bodies 212 is described as an example. However, the guide roller unit 210 may include one roller body 212. In the above embodiment, since the tape material T is introduced into the guide roller unit 210 from the −Z-axis direction, the guide roller unit 210 with which the tape material T is to be brought into contact is different between a case of increasing the tape pitch and a case of reducing the tape pitch. However, when the tape material T is introduced to the guide roller unit 210 from the X-axis direction, and the feeding direction of the tape material 1' is changed in the guide roller unit 210, the other roller body 212 is unnecessary because the tape material T is always in contact with the roller body 212 on one side thereof.

In the above embodiment, a configuration in which the tape arranging device 140 includes one shaft portion 250 is described as an example. However, a plurality of shaft portions 250 may be provided. That is, the support portions may be moved into a W shape (or M shape) by the moving unit 220.

In the above embodiment, a case in which the guide roller unit 210C is supported by the shaft portion 250 is described as an example. However, the guide roller unit 210C is not an essential component. For example, when the number of the tape materials T is an even number, the guide roller unit 210C may be omitted. Further, the number of guide roller units 210A may be different from the number of guide roller units 210B.

In the above embodiment, a case in which the downstream support roller 114a and the downstream support roller 114b are provided to be different in positions in the Y-axis direction in FIG. 1 is described as an example. However, the positions of the downstream support roller 114a and the downstream support roller 114h may be the same. The downstream support roller 114a and the downstream support roller 114b may be replaced by a single roller. Similarly, in the above embodiment, the upstream support roller 116a and the upstream support roller 116b are provided to be different in positions in the Y-axis direction in FIG. 1 is described as an example. However, the positions of the upstream support roller 116a and the upstream support roller 116b may be the same. Further, the upstream support roller 116a and the upstream support roller 116b may be replaced by a single roller.

In the above embodiment, a configuration in which the composite material manufacturing apparatus 100 includes the downstream support rollers 114a and 114h, and the upstream support rollers 116a and 116b is described as an example. However, the downstream support rollers 114a and 114b, and the upstream support rollers 116a and 116b are not essential components. For example, the downstream support rollers 114a and 114b can be omitted by disposing the compaction roller 112 at a position substantially corresponding to the downstream support rollers 114a and 114b in place of the downstream support rollers 114a and 114b. Further, the upstream support rollers 116a and 116b can also be omitted by changing a receiving direction of the tape material T and changing the path of the tape material T.

In the above embodiment, a configuration in which the composite material manufacturing apparatus 100 includes the width adjusting devices 130 is described as an example. However, the width adjustment device 130 is not an essential component. When the width adjustment device 130 is not provided, only the tape pitch is adjusted without changing the tape width.

According to the present disclosure, a plurality of tape materials can be arranged at any tape pitch.

What is claimed is:

1. A tape arranging device comprising:
   guide roller units through which tape materials are capable of passing respectively, each of the tape materials being configured with fibers impregnated with resin; and
   a moving unit configured to move the guide roller units in a lengthwise direction of the tape materials and to change a distance between adjacent ones of the guide roller units, the adjacent ones of the guide roller units being adjacent to each other,
   wherein, after the move in the lengthwise direction of the tape materials by the moving unit, a guide roller unit of the guide roller units that was moved has an equal distance in the lengthwise direction between each adjacent guide roller unit,
   wherein the moving unit includes a first support portion, a second support portion, an only one shaft portion, and a drive unit, the first support portion including a first end portion and a second end portion opposite to the first end portion, the second support portion including a third end portion and a fourth end portion opposite to the third end portion,
   wherein the adjacent ones of the guide roller units include first guide roller units and second guide roller units, the first guide roller units being adjacent to each other, the second guide roller units being adjacent to each other,
   wherein the first support portion supports the first guide roller units such that rotation axes of the first guide roller units are substantially parallel to each other,
   wherein the second support portion supports the second guide roller units such that rotation axes of the second guide roller units are substantially parallel to each other,
   wherein the shaft portion rotatably supports the first end portion of the first support portion and the third end portion of the second support portion, and
   wherein the drive unit is configured to rotate the first support portion and the second support portion in a direction in which the second end portion of the first support portion and the fourth end portion of the second support portion are away from each other or in a direction in which the second end portion of the first support portion and the fourth end portion of the second support portion approach each other such that the first support portion and the second support portion form a V-shape with the shaft portion as a base point.

2. The tape arranging device according to claim 1, wherein the moving unit is configured to move the guide roller units so as to change positions of the adjacent ones of the guide roller units in a direction in which the tape materials are to pass through the guide roller units.

3. The tape arranging device according to claim 1, wherein each of the guide roller units includes:
   a pair of roller bodies, and
   connecting portions configured to rotatably support the pair of roller bodies such that rotation axes of the pair of roller bodies are substantially parallel to each other, and
   wherein the connecting portions are rotatably supported by the first support portion or the second support portion.

4. The tape arranging device according to claim 3, wherein the adjacent ones of the guide roller units are configured such that the rotation axes of the roller bodies of the first guide roller units are substantially parallel to the rotation axes of the roller bodies of the second guide roller units.

5. The tape arranging device according to claim 1, wherein the moving unit changes a vertical distance between a center point of the adjacent ones of the guide roller units.

6. The tape arranging device according to claim 1, wherein the moving unit moves the guide roller units on a basis of a pitch of the tape materials.

7. The tape arranging device according to claim 1, wherein the guide roller units arrange the tape materials without a gap.

8. The tape arranging device according to claim 1, wherein the moving unit moves the adjacent ones of the guide roller units such that a distance between tape centers of the adjacent tapes is always $r \cos \theta$ at equal distances.

9. The tape arranging device according to claim 1, wherein the moving unit rotates a second guide roller unit of the guide roller units about a center point of a first guide roller unit that is adjacent to the second guide roller unit.

10. The tape arranging device according to claim 1, wherein one of the guide roller units remains at a fixed location when the moving unit moves the guide roller units.

\* \* \* \* \*